(12) United States Patent
Gusat et al.

(10) Patent No.: US 10,171,365 B2
(45) Date of Patent: Jan. 1, 2019

(54) TURBOLINK: METHOD AND APPARATUS FOR CONTROLLING INPUT/OUTPUT SIGNALING SPEED

(71) Applicant: International Business Machines Corporation, Armonk, NY (US)

(72) Inventors: Mitch Gusat, Langnau (CH); Thomas Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/177,574

(22) Filed: Jun. 9, 2016

(65) Prior Publication Data

US 2017/0359266 A1    Dec. 14, 2017

(51) Int. Cl.
| | |
|---|---|
| H04L 12/825 | (2013.01) |
| H04L 12/26 | (2006.01) |
| H04L 12/801 | (2013.01) |
| H04L 12/835 | (2013.01) |

(52) U.S. Cl.
CPC ............ *H04L 47/266* (2013.01); *H04L 43/08* (2013.01); *H04L 47/11* (2013.01); *H04L 47/29* (2013.01); *H04L 47/30* (2013.01)

(58) Field of Classification Search
CPC ....... H04L 47/266; H04L 47/30; H04L 43/08; H04L 47/11; H04L 47/29
See application file for complete search history.

(56) References Cited

U.S. PATENT DOCUMENTS

| | | |
|---|---|---|
| 8,447,187 B2 | 5/2013 | Ledentsov et al. |
| 8,766,284 B1 | 7/2014 | Dutta |
| 9,049,271 B1* | 6/2015 | Hobbs ................ H04L 47/25 |

(Continued)

FOREIGN PATENT DOCUMENTS

CN    101864280 A    10/2010

OTHER PUBLICATIONS

Young, Ian A., et al., "Optical I/O Technology for Tera-Scale Computing", IEEE Journal of Solid-state Circuits, vol. 45, No. 1, Jan. 2010, 14 pgs.

(Continued)

*Primary Examiner* — Charles C Jiang
*Assistant Examiner* — Thad N Defauw
(74) *Attorney, Agent, or Firm* — Harrington & Smith

(57) ABSTRACT

Embodiments of the present invention may provide improved handling of communication characteristics, such as burstiness, latency-sensitive applications, bandwidth-sensitive applications, etc., to improve peak performance while not compromising other characteristics, such as thermal design power of the input/output chip packages. In an embodiment, in a control circuit that may be connected to and control a data transmitter, a method of transmitting data in a network may comprise receiving at least one feed-forward signal from the data transmitter, receiving at least one feedback signal from at least a first node of the network, comparing the at least one feed-forward signal with at least one threshold or condition, comparing the at least one feedback signal with at least one threshold or condition, and generating a signal indicating that a burst transmission should be started or stopped.

16 Claims, 3 Drawing Sheets

(56) References Cited

U.S. PATENT DOCUMENTS

| | | | |
|---|---|---|---|
| 2005/0232184 A1* | 10/2005 | Borella | H04W 64/00 370/328 |
| 2012/0250378 A1* | 10/2012 | Kok | H02M 3/156 363/78 |
| 2012/0328235 A1 | 12/2012 | Christensen et al. | |
| 2013/0194946 A1* | 8/2013 | Basso | H04L 47/56 370/252 |
| 2016/0043854 A1* | 2/2016 | Damnjanovic | H04L 5/0048 370/329 |

OTHER PUBLICATIONS

Dixit, Ashish, et al., "An Inovative Optical Transceiver Architecture for High Speed Data Interconnectivity Using CMOS IC for Optical Interconnects", International Journal of Science and Modern Engineering (IJISME), ISSN: 2319-6386, vol. 1, Issue 8, Jul. 2013, 6 pgs.

* cited by examiner

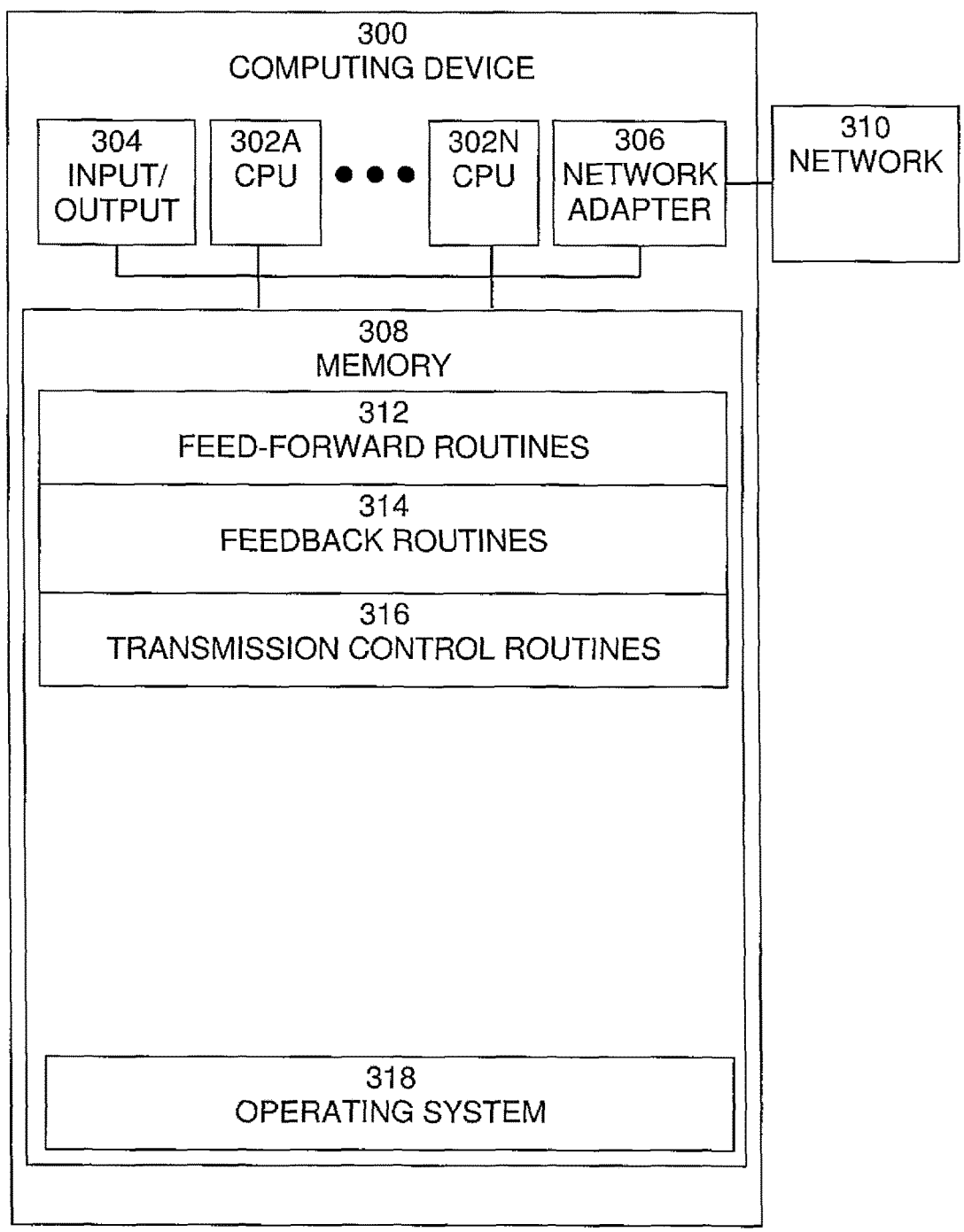

TURBOLINK: METHOD AND APPARATUS FOR CONTROLLING INPUT/OUTPUT SIGNALING SPEED

BACKGROUND

The present invention relates to techniques for controlling input/output signaling speed of network elements in telecommunications networks with varying usage levels.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Many packet-based telecommunications networks exhibit bursty or inconsistent traffic levels. Typically, a network may be relatively empty when handling average or typical levels of traffic. However, the same network may suffer congestion when handling peak levels of traffic. The issue may be especially severe in the environment of a data center, such as a cloud datacenter that may host diverse applications, mixing workloads that require small predictable latency with others requiring large sustained throughput. For example, many cloud or distributed computing networks may be under-utilized, having average link utilizations of 5-20%, with many typically under 10% average utilization. For example, such underused links could become potential 'donors' from a thermal TDP perspective. These same, or other, often under-utilized resources may occasionally become overbooked—hence potential TDP 'borrowers/receivers' that need, e.g., 110-200% faster TRANSMISSION/TX rates for limited periods—to avoid being hotspots or bottlenecks during brief congestive traffic events that may have significant financial consequences on users of the network, such as datacenter tenants and operators. This may lead to more over-provisioning and average under-utilizations, while still not solving the congestion during peak utilization.

Further, network traffic, such as that involved in cloud datacenter or other datacenter applications, may be becoming increasingly bursty due to the increasing usage of bursty applications. For example, applications themselves may be becoming increasingly bursty. Likewise, new processors may support interrupt coalescing, in which interrupt processing is delayed until a certain amount of processing is pending, which may lead to larger bursts of traffic when the interrupts are finally processed. Further, much network traffic may involve relatively small, but frequent, units of network traffic, but may be very latency sensitive.

Conventional schemes for handling bursty traffic may operate relatively slowly and may interfere with the peak traffic and may compromise performance agreements. A need arises for a technique that may provide improved handling of communication characteristics, such as burstiness, latency-sensitive applications, bandwidth-sensitive applications, etc., to improve peak performance while not compromising other characteristics, such as thermal design power of the input/output chip packages.

SUMMARY

This section is intended to include examples and is not intended to be limiting.

Embodiments of the present invention may provide improved handling of communication characteristics, such as burstiness, latency-sensitive applications, bandwidth-sensitive applications, etc., to improve peak performance while not compromising other characteristics, such as thermal design power of the input/output chip packages. For example, embodiments of the present invention may provide fast operation with cross-layer control inputs, improved control lags and congestion controls, and may enable new datacenter and high-performance computing techniques.

In an embodiment of the present invention, in a control circuit that may be connected to and control a data transmitter, a method of transmitting data in a network may comprise receiving at least one feed-forward signal from a local or upstream data transmitter, receiving at least one feedback signal from at least a next or downstream first node of the network, comparing the at least one feed-forward signal with at least one threshold or condition, comparing the at least one feedback signal with at least one threshold or condition, and generating a signal indicating that a burst transmission should be started or stopped based on the comparison results.

In an embodiment, the data transmitter may comprise storage for data to be transmitted and the feed-forward signal from the data transmitter may comprise an indication of an occupancy of the storage with data to be transmitted, a rate of change of the occupancy of the storage with data to be transmitted, and a timer indicating either a time that a first packet of the current burst has waited for transmission, or a time since a last burst transmission was performed. The feedback signal may comprise a near feedback signal from at least one network node at a network location near the data transmitter, and a remote feedback signal from at least one network node at a network location near a destination of data transmission from the data transmitter, from the destination of data transmission from the data transmitter, or both. The method may further comprise comparing the occupancy of the storage with data to be transmitted to a first threshold, a rate of change of the occupancy of the storage with data to be transmitted to a second threshold, and a timer indicating a time since a last burst transmission was performed with a maximum delay time, and generating an indication that a burst transmission should be started or stopped based on the results of the comparisons. The method may further comprise determining a status of the near feedback signals and a status of the remote feedback signals, and generating an indication that a burst transmission should be started or stopped based on the status of the near feedback signals and the status of the remote feedback signals. The near feedback signals may comprise at least one of a Link-Level Flow Control signal, a PFC/CEE signal, a Credit/IB signal, a Credit/PCIe signal, a Credit/Omnipath signal, a STOP/GO signal, and a responsive receive buffer reservation signal. The remote feedback signals may comprise at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal. The method may further comprise receiving a signal indicating a temperature of the data transmitter, comparing the temperature of the data transmitter to a threshold temperature, and generating an indication that a burst transmission should be started or stopped based on whether the temperature of the data transmitter exceeds the threshold temperature.

In an embodiment of the present invention, an apparatus is provided comprising: at least one processor; and at least one non-transitory memory including computer program code, the at least one memory and the computer program code configured to, with the at least one processor, cause the apparatus to: receive at least one feed-forward signal from a local or upstream data transmitter; receive at least one feedback signal from at least a next or downstream first node of the network; and compare the at least one feed-forward signal with at least one threshold or condition, compare the at least one feedback signal with at least one threshold or condition, and generate a signal indicating that a burst transmission should be started or stopped based on the comparison results.

In an embodiment of the present invention, a computer program product for transmitting data in a network, may comprise a non-transitory computer readable storage having program instructions embodied therewith, the program instructions executable by a computer, to cause the computer to perform a method that may comprise receiving at least one feed-forward signal from a local or upstream data transmitter, receiving at least one feedback signal from at least a next/downstream first node of the network, comparing the at least one feed-forward signal with at least one threshold or condition, comparing the at least one feedback signal with at least one threshold or condition, and generating a signal indicating that a burst transmission should be started or stopped based on the comparison results.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary block diagram of a computer system, in which embodiments of processes involved in the system, method, and computer program product described herein may be implemented.

DETAILED DESCRIPTION

Figure 1:
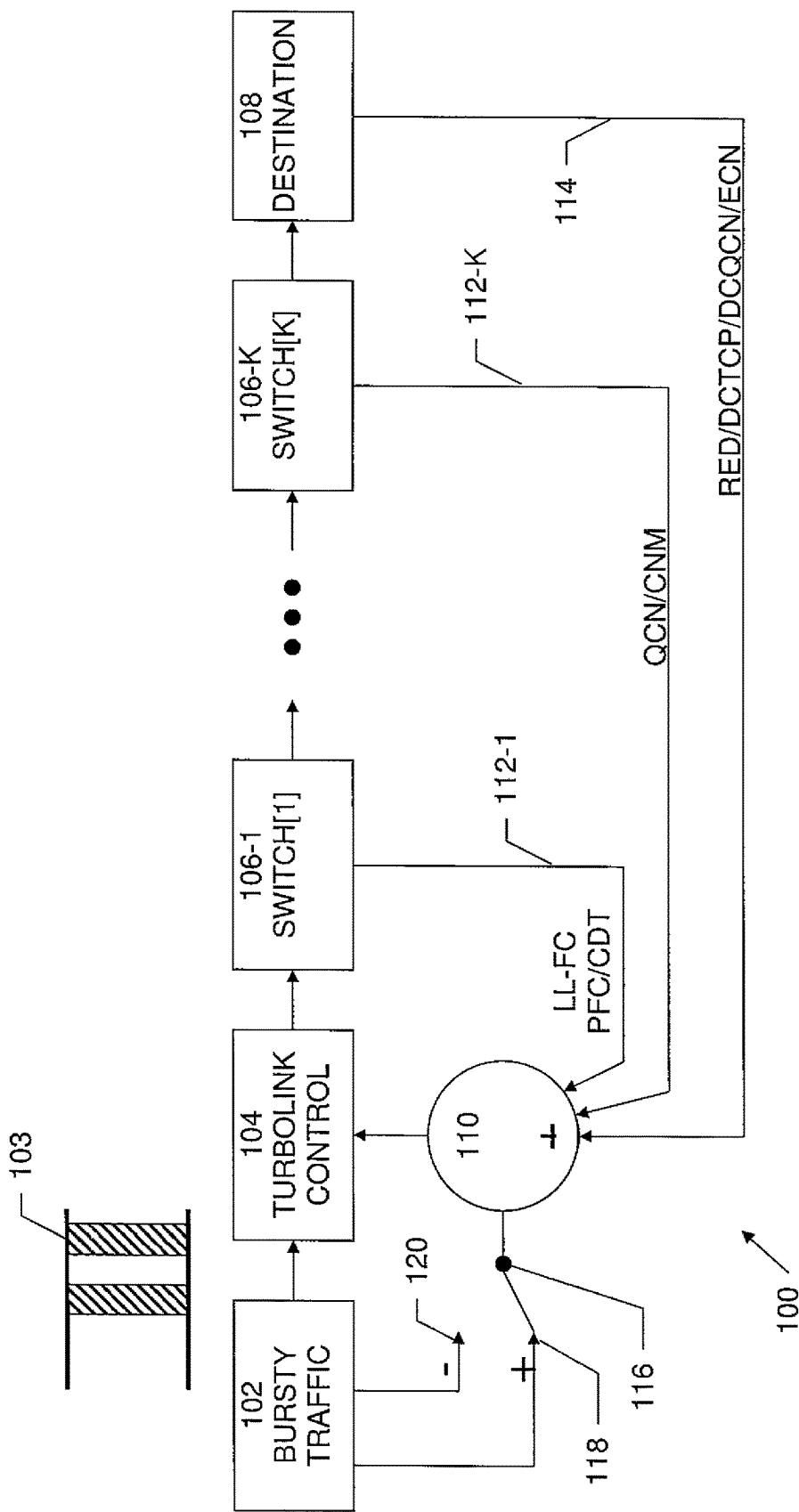
FIG. 1 is an exemplary block diagram of an embodiment of a communication network, in which embodiments of the present invention may be implemented.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Embodiments of the present invention may provide improved handling of communication characteristics, such as burstiness, latency-sensitive applications, bandwidth-sensitive applications, etc., to improve peak performance while not compromising other characteristics, such as thermal design power of the input/output chip packages. For example, embodiments of the present invention may provide fast operation with cross-layer control inputs, improved control lags and congestion controls, and may enable new datacenter and high-performance computing techniques.

Communications in data centers is typically based on networks running the TCP/IP set of protocols. Data centers may contain a set of routers and switches that transport traffic between the servers and to the outside world. Much of the communications in such data centers is typically transmitted over optical links, which may use opto-electronic chips for their input/output (I/O) circuitry. Such opto-electronic chips typically have a thermal budget or thermal design power (TDP), which is the amount of heat generated by the circuitry of the chip that can be dissipated by the chip packaging and cooling, without exceeding a specified maximum temperature.

For opto-electronic chips with I/O circuitry, embodiments of the present invention provide techniques to control the energy or joint power usage of the chip, while also controlling the performance, such as delay and throughput, using closed loop control, such as feed-forward and feedback, with thermal constraints. For example, embodiments may maximize the global chip throughput and/or minimize the traffic Burst Completion Time, subject to staying within the thermal budget or TDP envelope of the chip. Such embodiments may, under the TDP constraints of a transmitting chip package, maximize the amount of injected communication traffic that is likely to be received at the destination end while minimizing delays. Embodiments may use multiple feedback and feed-forward control loops to control which links/channels should have priority in finishing their transmissions, before the entire chip overheats. Such control may result in control over the timing of burst transmissions in a way that use a typical or other suitable pulse width modulation (PWM)-like scheme in combination with the methods hereby described to control the transmission rates, and thus the link speed/utilization, for example, between 0% and 200%, vs. the nominal rated speed of 100%.

Some well-known terms and acronyms are used herein. For clarity, these terms and acronyms are described herein. Link-Level Flow Control (LL-FC) is a closed loop flow control method typical typically used in Layer 2 networks. For example, Priority Flow Control (PFC) as described in the 802.1Qbb standard, or the Credits (CDT) method, used in, for example, Peripheral Component Interconnect Express (PCIe), the InfiniBand Architecture (IBA), etc.

Quantized Congestion Notification (QCN), as described in the 802.1Qau standard.

Congestion Notification Message (CNM), as used by QCN.

Datacenter Transmission Control Protocol (DC-TCP).

Remote Direct Memory Access (RDMA)

Datacenter Quantized Congestion Notification (DC-QCN).

Explicit_Congestion_Notification (ECN/RED).

Referring to FIG. 1, an example of a communication network 100, in which embodiments of the present invention may be implemented, is shown. Network 100 may include one or more bursty traffic sources 102, turbolink controller 104, a plurality of network switches 106-1-106-K, and a network traffic destination 108. Bursty traffic sources 102 may include computer systems, such as servers or other systems, which may generate bursty network traffic 103 in inconsistent or changing patterns. Network switches 106-1-106-K may include any type of network node or packet switching devices, such simple packet switches, managed packet switches, network hubs, routers, layer-3 switches, multilayer switches, etc. Traffic destination 108 may include computer systems, such as servers or other systems, which may receive network traffic. For clarity, only a single traffic path and set of components is shown as an example in FIG. 1. A typical system may include many such components and traffic paths, perhaps hundreds or thousands in large data centers.

Turbolink controller 104 may receive bursty traffic 103 from bursty traffic sources 102 and may control the rate and bandwidth of transmission of this traffic out to the traffic path. Also shown in FIG. 1 is control combining element 110. Control combining element 110 may receive traffic feedback signals 112-1-112-K from one or more network switches 106-1-106-K and from traffic feedback signal 114 from traffic destination 108. Control combining element 110 may then provide a control signal to turbolink controller 104, so that turbolink controller 104 may control the rate and bandwidth of transmission of the traffic.

Feedback signals 112-1-112-K and 114 may include standard traffic control signals, such as priority flow control (PFC), Credit/CDT, QCN, CNM, Data Center Transmission Control Protocol (DCTCP), DC-QCN, Explicit Congestion Notification (ECN/RED), etc. Feedback signals 112-1-112-K and 114 may be input to control combining element 110, which combines feedback signals 112-1-112-K and 114 to generate a signal representing the state of the traffic path through network switches 106-1-106-K, and traffic destination 108. Feedback signals 112-1-112-K and 114 may be divided into two groups—feedback near "FbNear" and feedback remote "FbRemote".

Feedback near signals may be feedback signals from network nodes located close in the traffic path to Turbolink controller 104, such as, in the example shown in FIG. 1, feedback signal 112-1 from switch 106-1. Examples of feedback near signals may include Link-Level Flow Control (LL-FC) signals from the next hop downstream, such as PFC/CEE, Credit/IB, Credit/PCIe, Credit/Omnipath, STOP/GO, responsive receive buffer reservation in Switch 106-1, etc. This signal may represent a binary value, and may indicate the amount of credits available for the credit schemes, or the transmit time for the other schemes, for the current burst injection signal.

Feedback remote signals may be feedback signals from network nodes located remotely in the traffic path from turbolink controller 104, such as, in the example shown in FIG. 1, feedback signal 112-K from switch 106-K and feedback signal 114 from traffic destination 108. Examples of feedback remote signals may include signals from any downstream node, such as direct (multibit) congestion notifications, such as BECN/CNM as in QCN, or indirect (single bit) FECN/BECN congestion notifications such as IB CCA, DC-TCP, DC-QCN, TCP/RED/ECN, or a combination of multiple signals of each type or of both types.

An additional input to control combining element 110 may be feed-forward signal 116, which is generated from bursty traffic from source 102 and may be applied to control combining element 110 with either positive sign 118 or negative sign 120. Examples of feed-forward signals may include a local transmit queue occupancy ("x") and gradient or rate of change of the local transmit queue occupancy ("x") (forming a vector {x,x'}) and a burst accumulation timer ("Twait") indicating a time since a last burst transmission was performed, which may be compared to a maximum delay before at least a partial burst/container is injected in the traffic stream.

Figure 2:
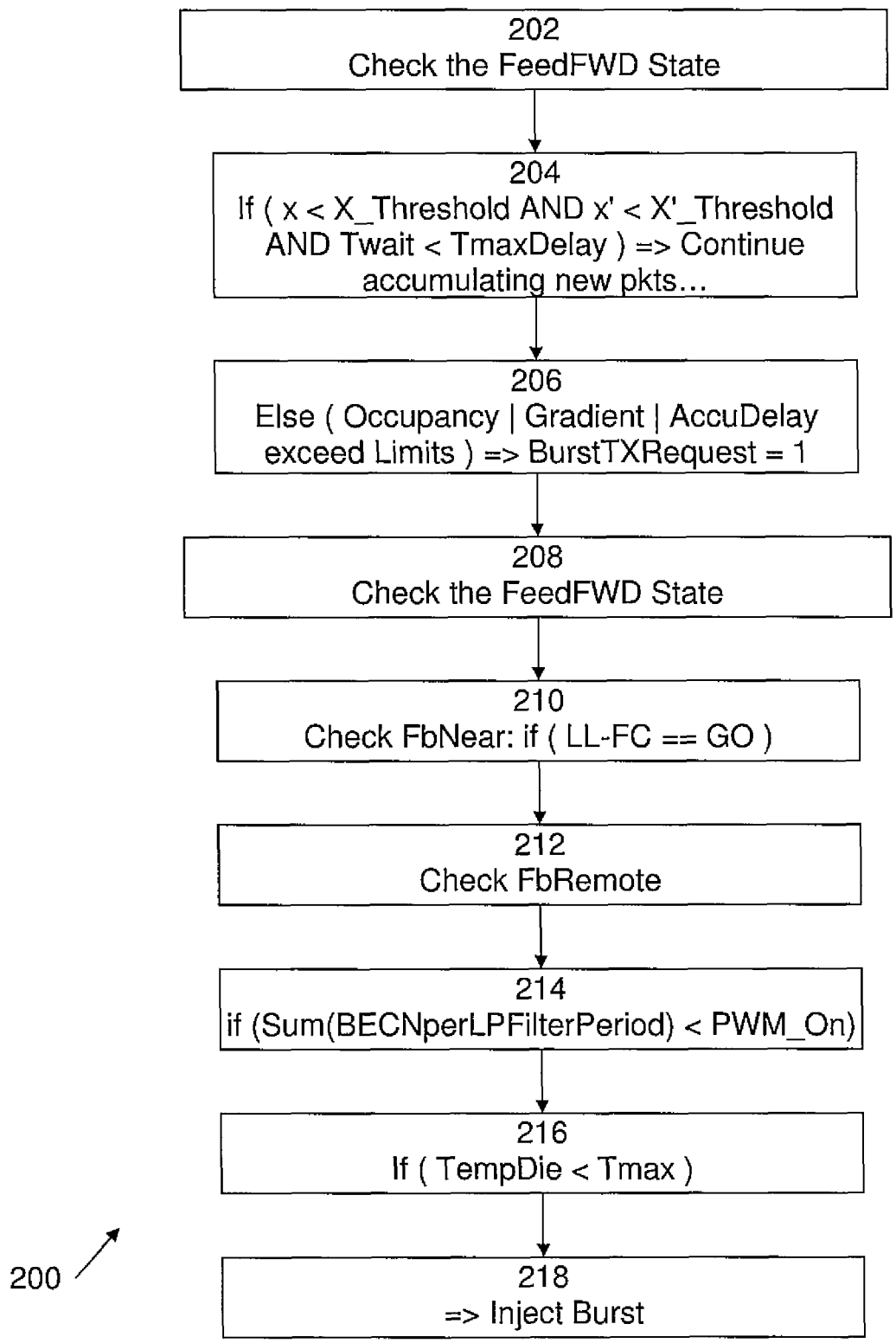
FIG. 2 is an exemplary process flow diagram of an embodiment of a process of transmission control in the network shown in FIG. 1.

FIG. 2 is an exemplary flow diagram of an embodiment of a process 200 of transmission control in the network shown in FIG. 1. It is best viewed in conjunction with FIG. 1. Process 200 begins with 202 in which the feed-forward state of the traffic path is checked. For example, new packet arrivals and their backlog in the local queue may be sampled as x=occupancy and x'=gradient. In 204, the local transmit queue occupancy x and gradient x' may be compared with their respective thresholds "X" and "X", and the current burst accumulation time Twait with the maximum delay time. If neither threshold nor the delay time have been exceeded, this means that not enough burst packets are available yet, so the system continues accumulating new packets. In 206, if either threshold or the delay time have been exceeded, this means that enough burst packets are waiting in the burst container, or the delay per packet has been exceeded, then the burst transmit request signal ("BurstTXRequest") is activated.

In 208, if BurstTXRequest is activated, then the feed-back state of the traffic path is checked. This is done by, in 210, checking the FbNear signal status, such as checking if LL-FC signals 112-1 indicate a "GO" or transmit condition. For example, if there are sufficient credits or PFC status is not STOP, then next-hop reception is enabled. This is typically true in lossy Ethernet operation, leading to a lack of LL-FC signals indicating a GO or transmit condition, and likewise for a STOP condition.

In 212, the FbRemote signal status is checked, such as by the Turbolink controller 104 snoops the xECN signals 114 arriving at the transmit source 102. In 214, it is determined whether a computed period exceeds the time the PWM has been on. The computed period represents a simulation of simple low-pass filter, which, for example, may integrate (sum) the ECN signal with a fixed RESET period, which may equal the logical round trip time (RTT) delay, link flight+SERDES+higher layer logical delay/time constant and/or other time constants. In 216, the temperature of the die or chip of the transmit circuitry may be determined and compared with a maximum allowed temperature ("Tmax") or other temperatures under the TDP envelope, so as to not exceed the thermal budget.

In 218, the burst transmission is performed until completed or until one of the feedback conditions checked in 212-216 indicates that the burst transmission should be stopped. For example, a stop indication may include, in 210, the FbNear signal not indicating a GO condition, in 212, the xECN signals indicate a stop condition, in 214, the computed period exceeds the PWM on time, and in 216, the determined temperature exceeds Tmax.

In an embodiment, memory may be used to store the burst data to be transmitted. The burst container size can be fixed or adaptive, for example between 4 and 128 maximum transmission units (MTUs), which for Ethernet, for example, is about 1550 bytes.

An exemplary block diagram of a computer system 300, in which the embodiments of processes involved in the system, method, and computer program product described herein may be implemented, is shown in FIG. 3. Computer system 300 is typically a programmed general-purpose computer system, such as an embedded processor, system on a chip, personal computer, workstation, server system, and minicomputer or mainframe computer. Computer system 300 may include one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present invention also contemplates embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof such as enhanced IDE (EIDE) or ultra-direct memory access (UDMA), or a small computer system interface (SCSI) based interface, or a variation or enhancement thereof such as fast-SCSI, wide-SCSI, fast and wide-SCSI, etc., or Serial Advanced Technology Attachment (SATA), or a variation or enhancement thereof or a fiber channel-arbitrated loop (FC-AL) interface.

The contents of memory 308 vary depending upon the function that computer system 300 is programmed to perform. However, one of skill in the art would recognize that these routines, along with the memory contents related to those routines, may be included on one system, or may be distributed among a plurality of systems, based on well-known engineering considerations. The present invention contemplates any and all such arrangements.

In the example shown in FIG. 3, memory 308 may include feed-forward routines 312, feedback routines 314, transmission control routines 316, and operating system 318. Feed-forward routines 312 may include routines to monitor the status of feed-forward signals. Feedback routines 314 may include routines to monitor the status of feedback signals. Transmission control routines 316 may include routines to receive the results of the monitoring of the feed-forward and the feedback signals and generate signals to control the burst transmission. Operating system 318 provides overall system functionality.

In an embodiment of the present invention, a system for transmitting data in a network may comprise circuitry adapted to receive at least one feed-forward signal from a local or upstream data transmitter, circuitry adapted to receive at least one feedback signal from at least a next/downstream first node of the network, and circuitry adapted to compare the at least one feed-forward signal with at least one threshold or condition, compare the at least one feedback signal with at least one threshold or condition, and generate a signal indicating that a burst transmission should be started or stopped based on the comparison results.

An example method may comprise: receiving at least one feed-forward signal from a local or upstream data transmitter; receiving at least one feedback signal from at least a next or downstream first node of a network; comparing the at least one feed-forward signal with at least one threshold or condition; comparing the at least one feedback signal with at least one threshold or condition; and generating a signal indicating that a burst transmission should be started or stopped based on the comparison results.

The data transmitter may comprise storage for data to be transmitted and the feed-forward signal from the data transmitter may comprise at least one of an indication of an occupancy of the storage with data to be transmitted, a rate of change of the occupancy of the storage with data to be transmitted, and a timer indicating either a time that a first packet of the current burst has waited for transmission, and a time since a last burst transmission was performed. The feedback signal may comprise a near feedback signal from at least one network node at a network location near the data transmitter, and a remote feedback signal from at least one network node at a network location near a destination of data transmission from the data transmitter, from the destination of data transmission from the data transmitter, or both. The method may further comprise comparing the occupancy of the storage with data to be transmitted to a first threshold, a rate of change of the occupancy of the storage with data to be transmitted to a second threshold, and a timer indicating a time since a last burst transmission was performed with a maximum delay time; and generating an indication that a burst transmission should be started or stopped based on the results of the comparisons. The method may further comprise: determining a status of the near feedback signals and a status of the remote feedback signals; and generating an indication that a burst transmission should be started or stopped based on the status of the near feedback signals and the status of the remote feedback signals. The near feedback signals may be at least one of a Link-Level Flow Control signal, a PFC/CEE signal, a Credit/IB signal, a Credit/PCIe signal, a Credit/Omnipath signal, a STOP/GO signal, and a responsive receive buffer reservation signal. The remote feedback signals comprise at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal. The method may further comprise receiving a signal indicating a temperature of the data transmitter; comparing the temperature of the data transmitter to a threshold temperature; and generating an indication that a burst transmission should be started or stopped based on whether the temperature of the data transmitter exceeds the threshold temperature.

An example embodiment may be provided in an apparatus comprising at least one processor, and at least one non-transitory memory including computer program code, the at least one memory and the computer program code configured to, with the at least one processor, cause the apparatus to: receive at least one feed-forward signal from a local or upstream data transmitter; receive at least one feedback signal from at least a next or downstream first node of the network; and compare the at least one feed-forward signal with at least one threshold or condition, compare the at least one feedback signal with at least one threshold or condition, and generate a signal indicating that a burst transmission should be started or stopped based on the comparison results.

The data transmitter may comprise storage for data to be transmitted and the feed-forward signal from the data transmitter comprises an indication of an occupancy of the storage with data to be transmitted, a rate of change of the occupancy of the storage with data to be transmitted, and a timer indicating either a time that a first packet of the current burst has waited for transmission, or a time since a last burst transmission was performed. The feedback signal may comprise a near feedback signal from at least one network node at a network location near the data transmitter, and a remote feedback signal from at least one network node at a network location near a destination of data transmission from the data transmitter, from the destination of data transmission from the data transmitter, or both. The at least one memory and the computer program code may be configured to, with the at least one processor, further cause the apparatus to: compare the occupancy of the storage with data to be transmitted to a first threshold, a rate of change of the occupancy of the storage with data to be transmitted to a second threshold, and a timer indicating a time since a last burst transmission was performed with a maximum delay time; and generate an indication that a burst transmission should be started or stopped based on the results of the comparisons. The at least one memory and the computer program code may be configured to, with the at least one processor, further cause the apparatus to: determine a status of the near feedback signals and a status of the remote feedback signals; and generate an indication that a burst transmission should be started or stopped based on the status of the near feedback signals and the status of the remote feedback signals. The near feedback signals may be at least one of a Link-Level Flow Control signal, a PFC/CEE signal, a Credit/IB signal, a Credit/PCIe signal, a Credit/Omnipath signal, a STOP/GO signal, and a responsive receive buffer reservation signal. The remote feedback signals may be at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal.

The at least one memory and the computer program code may be configured to, with the at least one processor, further cause the apparatus to: receive a signal indicating a temperature of the data transmitter; compare the temperature of the data transmitter to a threshold temperature; and generate an indication that a burst transmission should be started or stopped based on whether the temperature of the data transmitter exceeds the threshold temperature.

An example embodiment may be provided in a computer program product for transmitting data in a network. The computer program product may comprise a non-transitory computer readable storage having program instructions embodied therewith, the program instructions executable by a computer, to cause the computer to perform a method comprising: receiving at least one feed-forward signal from a local or upstream data transmitter, receiving at least one feedback signal from at least a next or downstream first node of the network; comparing the at least one feed-forward signal with at least one threshold or condition; comparing the at least one feedback signal with at least one threshold or condition; and generating a signal indicating that a burst transmission should be started or stopped based on the comparison results.

The data transmitter may comprise storage for data to be transmitted and the feed-forward signal from the data transmitter may comprise an indication of an occupancy of the storage with data to be transmitted, a rate of change of the occupancy of the storage with data to be transmitted, and a timer indicating either a time that a first packet of the current burst has waited for transmission, or a time since a last burst transmission was performed. The feedback signal may be a near feedback signal from at least one network node at a network location near the data transmitter, and a remote feedback signal from at least one network node at a network location near a destination of data transmission from the data transmitter, from the destination of data transmission from the data transmitter, or both. The computer program product may further comprise program instructions for comparing the occupancy of the storage with data to be transmitted to a first threshold, a rate of change of the occupancy of the storage with data to be transmitted to a second threshold, and a timer indicating a time since a last burst transmission was performed with a maximum delay time; and generating an indication that a burst transmission should be started or stopped based on the results of the comparisons. The computer program product may further comprise program instructions for: determining a status of the near feedback signals and a status of the remote feedback signals; and generating an indication that a burst transmission should be started or stopped based on the status of the near feedback signals and the status of the remote feedback signals. The near feedback signals may be at least one of a Link-Level Flow Control signal, a PFC/CEE signal, a Credit/IB signal, a Credit/PCIe signal, a Credit/Omnipath signal, a STOP/GO signal, and a responsive receive buffer reservation signal. The remote feedback signals may be at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal. The computer program may further comprise program instructions for: receiving a signal indicating a temperature of the data transmitter; comparing the temperature of the data transmitter to a threshold temperature; and generating an indication that a burst transmission should be started or stopped based on whether the temperature of the data transmitter exceeds the threshold temperature.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   receiving at least one feed-forward signal from a local or upstream data transmitter;
   receiving at least one feedback signal from at least a next or downstream first node of a network;
   determining whether data is to be transmitted in a burst transmission by at least comparing the at least one feed-forward signal with at least one threshold or condition;
   in response to determining that the data is to be transmitted in the burst transmission, comparing the at least one feedback signal with at least one further threshold or condition, wherein the at least one feedback signal comprises a near feedback signal and a remote feedback signal, wherein the near feedback signal is from one or more first network nodes and the remote feedback signal is from one or more second network nodes, wherein each second network node is at a network location that is a greater number of hops away from the data transmitter than each first network node;
   receiving an indication of a temperature of the data transmitter;
   comparing the temperature of the data transmitter to a threshold temperature;
   generating a signal to indicate that the burst transmission is to be started or stopped based at least on the comparison of the at least one feedback signal with the at least one further threshold or condition and on whether the temperature of the data transmitter exceeds the threshold temperature; and
   causing the burst transmission to be transmitted based at least on the generated signal.

2. The method of claim 1, wherein the data transmitter comprises storage for data to be transmitted and the feed-forward signal from the data transmitter comprises an indication of an occupancy of the storage with data to be transmitted, a rate of change of the occupancy of the storage with data to be transmitted, and a timer indicating either a time that a first packet of the current burst has waited for transmission, or a time since a last burst transmission was performed.

3. The method of claim 1, wherein comparing the at least one feed-forward signal comprises:
   comparing the occupancy of the storage with data to be transmitted to a first threshold, a rate of change of the occupancy of the storage with data to be transmitted to a second threshold, and a timer indicating a time since a last burst transmission was performed with a maximum delay time; and generating an indication that the burst transmission is to be started or stopped based on the results of the comparisons.

4. The method of claim 3, further comprising:
   determining a status of the near feedback signals and a status of the remote feedback signals; and
   generating an indication that the burst transmission should be started or stopped based on the status of the near feedback signals and the status of the remote feedback signals.

5. The method of claim 4, wherein the near feedback signals comprise at least one of a Link-Level Flow Control signal, a PFC/CEE signal, a Credit/IB signal, a Credit/PCIe signal, a Credit/Omnipath signal, a STOP/GO signal, and a responsive receive buffer reservation signal.

6. The method of claim 5, wherein the remote feedback signals comprise at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal.

7. An apparatus comprising:
   at least one processor; and
   at least one non-transitory memory including computer program code, the at least one memory and the computer program code configured to, with the at least one processor, cause the apparatus to:
   receive at least one feed-forward signal from a local or upstream data transmitter;
   receive at least one feedback signal from at least a next or downstream first node of the network; and
   determine whether data is to be transmitted in a burst transmission by at least comparing the at least one feed-forward signal with at least one threshold or condition,
   in response to determination that the data is to be transmitted in the burst transmission, compare the at least one feedback signal with at least one further threshold or condition, wherein the at least one feedback signal comprises a near feedback signal and a remote feedback signal, wherein the near feedback signal is from one or more first network nodes and the remote feedback signal is from one or more second network nodes, wherein each second network node is at a network location that is a greater number of hops away from the data transmitter than each first network node,
   receive an indication of a temperature of the data transmitter;
   compare the temperature of the data transmitter to a threshold temperature;
   generate a signal to indicate that the burst transmission is to be started or stopped based at least on the comparison of the at least one feedback signal with the at least one further threshold or condition and on whether the temperature of the data transmitter exceeds the threshold temperature, and
   cause the burst transmission to be transmitted based at least on the generated signal.

8. The apparatus of claim 7, wherein the data transmitter comprises storage for data to be transmitted and the feed-forward signal from the data transmitter comprises an indication of an occupancy of the storage with data to be transmitted, a rate of change of the occupancy of the storage with data to be transmitted, and a timer indicating either a time that a first packet of the current burst has waited for transmission, or a time since a last burst transmission was performed.

9. The apparatus of claim 8, wherein feedback signal comprises:
   a near feedback signal from one or more first network nodes, wherein each first network node is at a network location within a first number of hops from the data transmitter, and
   a remote feedback signal from one or more second network nodes, wherein each second network node is located a greater number of hops from the data transmitter than each of the first network nodes.

10. The apparatus of claim 9, wherein comparison of the at least one feed-forward signal comprises:
    compare the occupancy of the storage with data to be transmitted to a first threshold, a rate of change of the occupancy of the storage with data to be transmitted to a second threshold, and a timer indicating a time since a last burst transmission was performed with a maximum delay time; and requesting the data to be transmitted in the burst transmission based on the results of the comparisons.

11. The apparatus of claim 10, wherein the at least one memory and the computer program code are configured to, with the at least one processor, further cause the apparatus to:

determine a status of the near feedback signals and a status of the remote feedback signals; and generate an indication that the burst transmission should be started or stopped based on the status of the near feedback signals and the status of the remote feedback signals.

12. The apparatus of claim 11, wherein the near feedback signals comprise at least one of a Link-Level Flow Control signal, a PFC/CEE signal, a Credit/IB signal, a Credit/PCIe signal, a Credit/Omnipath signal, a STOP/GO signal, and a responsive receive buffer reservation signal.

13. The apparatus of claim 12, wherein the remote feedback signals comprise at least one of a direct multibit congestion notification signal, a BECN/CNM signal, an indirect single bit congestion notification signal a FECN/BECN signal, a CCA signal, a DC-TCP signal, a DC-QCN/ECN signal, and a TCP/RED/ECN signal.

14. A computer program product for transmitting data in a network, the computer program product comprising a non-transitory computer readable storage having program instructions embodied therewith, the program instructions executable by a computer, to cause the computer to perform a method comprising:

receiving at least one feed-forward signal from a local or upstream data transmitter;

receiving at least one feedback signal from at least a next or downstream first node of the network;

determining whether data is to be transmitted in a burst transmission by at least, comparing the at least one feed-forward signal with at least one threshold or condition;

in response to determining that the data is to be transmitted in the burst transmission, comparing the at least one feedback signal with at least one further threshold or condition, wherein the at least one feedback signal comprises a near feedback signal and a remote feedback signal, wherein the near feedback signal is from one or more first network nodes and the remote feedback signal is from one or more second network nodes, wherein each second network node is at a network location that is a greater number of hops away from the data transmitter than each first network node;

receiving an indication of a temperature of the data transmitter;

comparing the temperature of the data transmitter to a threshold temperature;

generating a signal to indicate that the burst transmission is to be started or stopped based at least on the comparison of the at least one feedback signal with the at least one further threshold or condition and on whether the temperature of the data transmitter exceeds the threshold temperature; and causing the burst transmission to be transmitted based at least on the generated signal.

15. The computer program product of claim 14, wherein the data transmitter comprises storage for data to be transmitted and the feed-forward signal from the data transmitter comprises an indication of an occupancy of the storage with data to be transmitted, a rate of change of the occupancy of the storage with data to be transmitted, and a timer indicating either a time that a first packet of the current burst has waited for transmission, or a time since a last burst transmission was performed.

16. The computer program product of claim 14, further comprising program instructions for:

comparing the occupancy of the storage with data to be transmitted to a first threshold, a rate of change of the occupancy of the storage with data to be transmitted to a second threshold, and a timer indicating a time since a last burst transmission was performed with a maximum delay time; and requesting the data to be transmitted in the burst transmission based on the results of the comparisons.

* * * * *